June 10, 1969     D. S. CHISHOLM ET AL     3,448,513
METHOD FOR MAKING LONG HOLES IN FOAM BODIES
Filed Feb. 2, 1966
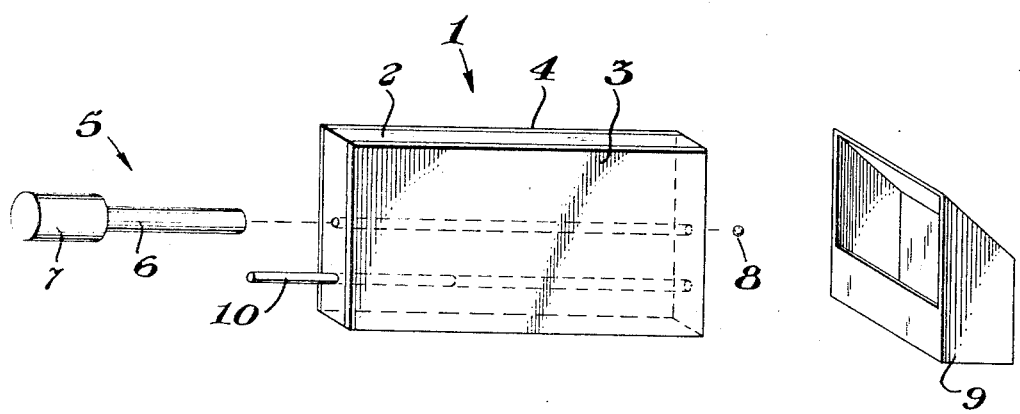
INVENTORS.
Douglas S. Chisholm
BY John S. Best
AGENT

United States Patent Office 3,448,513
Patented June 10, 1969

3,448,513
METHOD FOR MAKING LONG HOLES IN FOAM BODIES
Douglas S. Chisholm and John S. Best, Midland, Mich., assignors to The Dow Chemical Company, Midland, Mich., a corporation of Delaware
Filed Feb. 2, 1966, Ser. No. 524,522
Int. Cl. B28b 1/48; B29c 17/08
U.S. Cl. 29—525        7 Claims

ABSTRACT OF THE DISCLOSURE

Foam bodies such as foam plastic are provided with a long straight hole such as an edge to edge hole by perforating with a ball projectile or shotgun slug. Rifle and pistol projectiles do not provide desirable long holes.

---

This invention relates to a method for making long holes in foam bodies and more particularly relates to a method for making long holes in synthetic resinous foam plastic bodies.

Several varieties of insulating panels are available which utilize a cellular foam plastic core having facing sheets rigidly adhering to the major faces thereof. Such panels are particularly beneficial in construction as they can be prepared in relatively large sizes such as panels 4 feet in width, 8 inches in thickness and 24 feet in length. Panels of this nature are beneficially utilized in the construction of enclosures for various installations, such as warehousing, cold storage and the like. In order to achieve maximum economy of consrtuction, it is frequently desirable to utilize the foam cored panels as load bearing members rather than merely incorporating the panels within spaces defined by a plurality of frame members. Generally, when such panels are used in construction, it is desirable to maintain a minimal thermal path therethrough. That is, to make as full a use as possible of the insulating characteristics and avoid metal elements which completely penetrate the panel from one face to the other. Oftentimes it is desirable to assemble such panels in cooperation with other panels or with frame members in such a manner that the panel faces perform a load bearing function and are rigidly secured to adjacent panels or members. To achieve such a characteristic in the most convenient manner it is desirable that rods or tension members be disposed within the panels and extend from edge to edge. In order to install such rod or tension member it is necessary to provide an opening or passage within the foam core of the panels wherein the rods or members may be disposed. Usually the compression strength of the foamed core of an insulated panel is such that a rod may be forced therethrough but due to the length of the foam and occasional minor variation in the density as well as minor irregularities in the geometry of the rod to be inserted, it is extremely difficult to force a rod through the width or length of the foam core and have it emerge in the desired location. Generally to cut such openings or passages within a foam core with reasonable accuracy is extremely expensive and must be treated with great care if accuracy in cutting such long holes is to be maintained.

It would be desirable if there were available a method for forming long holes within large foam plastic bodies which does not require expensive tools.

It would be advantageous if there were available a method of forming long holes within foam bodies whereby the holes are accurately positioned.

It would also be advantageous if such a method could be readily practiced at the site of construction employing equipment of minimal weight.

These benefits and other advantages in accordance with the method of the present invention are achieved by forming long holes in a cellular insulating material by propelling a projectile of desired size into and through a cellular foam body at a velocity sufficient to penetrate the body and provide a long straight hole in the desired direction and of the desired size wherein the projectile is a body wherein the center of gravity is generally equally distant from the external surface thereof.

The method of the present invention is readily practiced employing foamed bodies of plastics, glass, metal and the like. Particularly suited for the practice of the present invention are foamed plastic bodies of closed cell and open cell construction including foamed polystyrene, foamed polyurethane, foamed polyvinyl chloride, foamed polyethylene, foamed polyvinyl fluoride, foamed phenolics and the like.

Beneficially in most applications the density of such foamed bodies is from about 1 to about 10 pounds per cubic foot and advantageously in the range of from about 1 pound per cubic foot to about 3 pounds per cubic foot. Projectiles suitable for penetrating foamed or cellular bodies in accordance with the present invention are those projectiles having their center of gravity at a location fairly equidistant from the surface of the body. Eminently suitable projectiles are spheres such as spheres of lead, steel, iron, nickel, brass and the like. Generally cylindrical projectiles may also be employed wherein one end of the projectiles has a rounded configuration and the center of gravity of the projectile is generally disposed at or near the geometric center of the body. Typical of such cylindrical projectiles are those projectiles commonly referred to as shotgun slugs. Such slugs may be of a rifled or nonrifled variety.

In the practice of the present invention the projectile may be propelled by a variety of means. Beneficially a gun or hollow tube is employed to initially guide the projectile in the manner of conventional firearms. If desired, explosives or conventional ballistic missile propellants or compressed gas may be used to impart sufficient energy to the projectile. Gases such as compressed air, nitrogen or the like are readily used. A gun or hollow tube, either smooth bored or rifled, that is, having lands and grooves disposed in a helical manner on the inner surface thereof is suitable for launching the projectile. However, smooth bore barrels or projectile launchers are eminently suitable for the practice of the present invention.

In the figure there is schematically illustrated a panel designated by the reference numeral 1. The panel 1 has a foam core 2 and facing sheets 3 and 4 adhered to the major surfaces of the foam core 2, a projectile launching device 5 is disposed adjacent on edge of the panel 1, the launching device 5 has a barrel 6 and a bridge 7, the barrel 6 is aligned in such a manner that a projectile traveling therefrom traverses a path generally parallel to the face sheets 3 and 4 and passes through the core 2. The projectile 8 is shown emerging from the foam core 2 and traveling toward a projectile stopping device or bullet trap 9. An elongated member 10 is shown partially disposed within a previously formed elongate opening formed in the core 2 of the panel 1.

By way of further illustration a gun is constructed from ¼ inch inside diameter stainless steel tubing 6 inches long and having a ⅛ inch (nominal) female pipe thread cut on one end thereof. A ⅛ inch steel pipe plug is fitted with a nipple to receive percussion caps and affixed to the threaded end of the pipe. A passageway is provided within the pipe plug in such a manner that the percussion cap discharges into a steel tube. The gun is loaded with one gram of FFFG black powder and an electrical resistance wire positioned adjacent the cap in order to provide means for the detonation thereof. A .25 caliber (¼ inch diameter) spherical buckshot is positioned in the barrel adjacent the black powder and the gun aimed at the edge of a polystyrene foam slab having a density of about 2 pounds per square foot. The percussion cap is detonated, the gun discharges propelling the buckshot with a muzzle velocity of about 1000 feet per second toward the foamed polystyrene body. The buckshot passes into the foam body which is subsequently sectioned to determine the path of the projectile. The projectile formed a long straight hole of about 60 inches in length and a diameter of about ¼ inch.

In a manner similar to the foregoing illustration a twenty gauge shotgun was employed to propel a commercially loaded rifled slug into a body of foamed polystyrene having a density of about 2 pounds per cubic foot. The body was then sectioned and a straight hole having a length of 181 inches is observed. Repetition of the foregoing experiment with the exception that a .410 gauge shotgun utilizing a .410 rifled slug results in a long straight hole having a length of 161 inches.

By way of comparison various other projectiles are discharged into like polystyrene bodies with the following results. A .25 caliber pistol results in a short straight hole of nonuniform configuration apparently caused by tumbling of the bullet (tumbling is end over end motion during flight). A .22 caliber long rifle pistol provided a curved hole of poor configuration and apparent tumbling of the bullet. Several rounds of 30–06 ammunition having a jacketed bullet of the nonexpanding variety produced irregular width holes of irregular configuration apparently due to tumbling. Similar unfavorable results were obtained utilizing a rifle and ammunition of .270 magnum caliber. A .12 gauge shotgun slug forms a long straight hole which extends the length of foam employed which is 24 feet.

In a manner similar to the foregoing illustration long straight holes are readily formed by utilizing a ballistic projectile wherein the center of gravity is generally symmetrical and disposed equidistant from the surface thereon.

What is claimed is:

1. A method of forming a long straight hole in a foamed body having a generally planar major surface, the method comprising propelling a projectile into the body in a desired direction generally parallel to the major surface and at a sufficient velocity to form a straight hole within the body, the projectile being of a configuration which has the center of gravity generally equidistant from the surface of the projectile.

2. The method of claim 1 wherein the projectile has a generally spherical configuration.

3. The method of claim 1 wherein the projectile has a generally cylindrical configuration.

4. The method of claim 1 wherein the foam body is a symmetric resinous cellular body.

5. The method of claim 4 wherein the foamed body is foamed polystyrene.

6. A method for forming a long straight hole in a foamed body comprising propelling a projectile into the body in a desired direction at a sufficient velocity to form a straight hole within the body, the projectile being of a configuration which has the center of gravity generally equidistant from the surface of the projectile, and subsequently installing an elongate member in the straight hole within the body.

7. The method of claim 1 wherein the foam body is a sandwich panel and the hole extends between opposed edges.

References Cited

UNITED STATES PATENTS

| 2,819,085 | 1/1958 | Brown et al. | 273—102.2 |
| 3,239,585 | 3/1966 | Karpovich et al. | 264—321 XR |
| 3,281,510 | 10/1966 | Lovret | 264—47 |
| 3,215,964 | 11/1965 | Horbach. | |
| 3,268,304 | 8/1966 | Vaught et al. | 29—183 |

OTHER REFERENCES

Busk, Hans: "Handbook for Hythe," London, Routledge, Warne, and Routledge, 1860, pp. 44–47; title page.

Whitworth, Joseph: "Miscellaneous Papers on Mechanical Subjects, Guns and Steel," London, Longmans, Green, Reader & Dyer, 1873, pp. 40–43; title page.

PHILIP E. ANDERSON, *Primary Examiner.*

U.S. Cl. X.R.

29—183; 264—154, 321